United States Patent
Wang et al.

(10) Patent No.: US 11,092,479 B2
(45) Date of Patent: Aug. 17, 2021

(54) SENSOR ASSEMBLY AND A DEVICE COMPRISING SUCH SENSOR ASSEMBLY

(71) Applicant: SIGNIFY HOLDING B.V., Eindhoven (NL)

(72) Inventors: Zhipei Wang, Eindhoven (NL); Shangwu Chen, Eindhoven (NL); Minghua Ye, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/623,129

(22) PCT Filed: Jun. 12, 2018

(86) PCT No.: PCT/EP2018/065458
§ 371 (c)(1),
(2) Date: Dec. 16, 2019

(87) PCT Pub. No.: WO2018/234094
PCT Pub. Date: Dec. 27, 2018

(65) Prior Publication Data
US 2020/0217713 A1 Jul. 9, 2020

(30) Foreign Application Priority Data

Jun. 19, 2017 (WO) ................ PCT/CN2017/089039
Aug. 11, 2017 (EP) ..................................... 17185924

(51) Int. Cl.
*G08B 13/19* (2006.01)
*G01J 1/02* (2006.01)
(Continued)

(52) U.S. Cl.
CPC .......... *G01J 1/0271* (2013.01); *G01J 1/0407* (2013.01); *G01J 1/0474* (2013.01); *G01J 1/4204* (2013.01);
(Continued)

(58) Field of Classification Search
None
See application file for complete search history.

(56) References Cited

U.S. PATENT DOCUMENTS 7,265,670 B2    9/2007  Pantus et al.
2003/0065472 A1  4/2003  Eckel et al.
(Continued)

FOREIGN PATENT DOCUMENTS

EP    1575009 A1    9/2005
EP    2533026 A2   12/2012
(Continued)

*Primary Examiner* — John F Mortell

(57) ABSTRACT

A sensor assembly, comprising a housing having a receiving window covered by an optically transparent cover. The housing accommodates electric components, at least comprising a motion sensor and an ambient light sensor. The motion sensor and the ambient light sensor are positioned such that light entering the cover impinges on the motion sensor and the ambient light sensor. Between the cover and the ambient light sensor is an optical diffuser positioned, such that light entering the cover traverses the optical diffuser before impinging on the ambient light sensor. The sensor assembly may be used separately or incorporated in an electric or electronic device.

14 Claims, 2 Drawing Sheets

(51) Int. Cl.
  *G01J 1/04*     (2006.01)
  *G01J 1/42*     (2006.01)
  *G01V 8/00*     (2006.01)
  *G08B 5/36*     (2006.01)
  *G02B 3/08*     (2006.01)

(52) U.S. Cl.
  CPC .............. *G01V 8/005* (2013.01); *G08B 5/36*
                 (2013.01); *G02B 3/08* (2013.01)

(56) References Cited

U.S. PATENT DOCUMENTS

| | | |
|---|---|---|
| 2005/0030180 A1 | 2/2005 | Pantus et al. |
| 2008/0093552 A1 | 4/2008 | Gorman et al. |
| 2008/0198010 A1* | 8/2008 | Richard ............... G08B 29/046 |
| | | 340/567 |
| 2012/0098661 A1 | 4/2012 | Stromberg et al. |
| 2015/0102212 A1 | 4/2015 | Ruh |
| 2015/0131287 A1* | 5/2015 | Marsh .................... F21V 15/01 |
| | | 362/260 |
| 2016/0110980 A1 | 4/2016 | Aggarwal et al. |
| 2016/0369991 A1 | 12/2016 | Lim et al. |
| 2016/0377275 A1 | 12/2016 | Lim et al. |
| 2017/0200035 A1* | 7/2017 | Teraura ............ G06K 19/06037 |
| 2017/0245347 A1* | 8/2017 | Zhou ...................... H05B 47/19 |
| 2017/0272706 A1* | 9/2017 | Jeong ....................... G08B 3/10 |

FOREIGN PATENT DOCUMENTS

| | | |
|---|---|---|
| WO | 2014135679 A1 | 9/2014 |
| WO | 2015128114 A1 | 9/2015 |

* cited by examiner

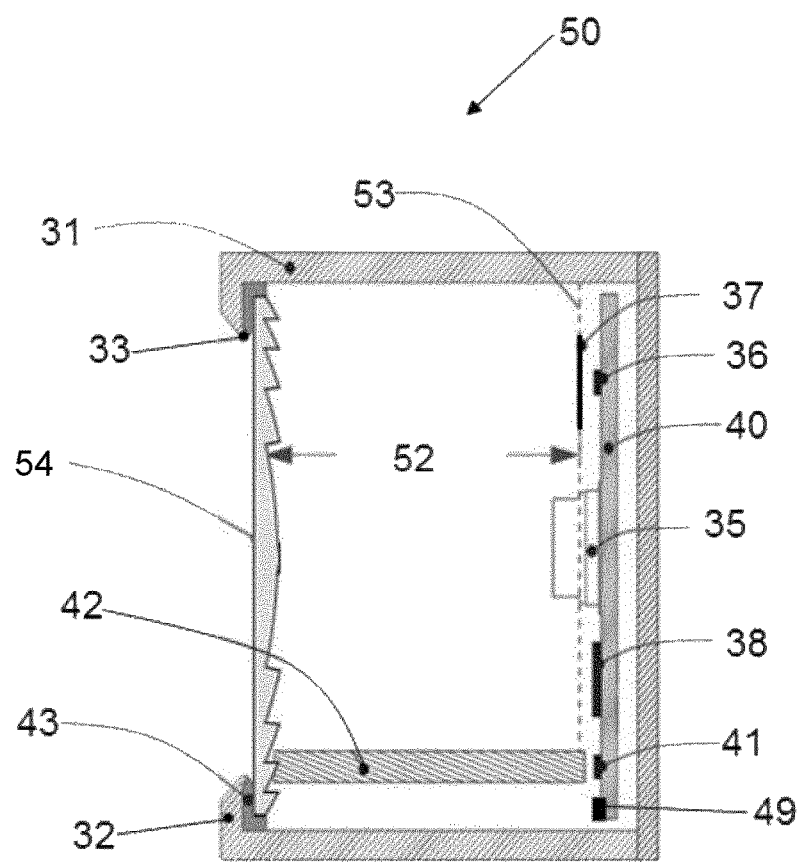
Fig. 5
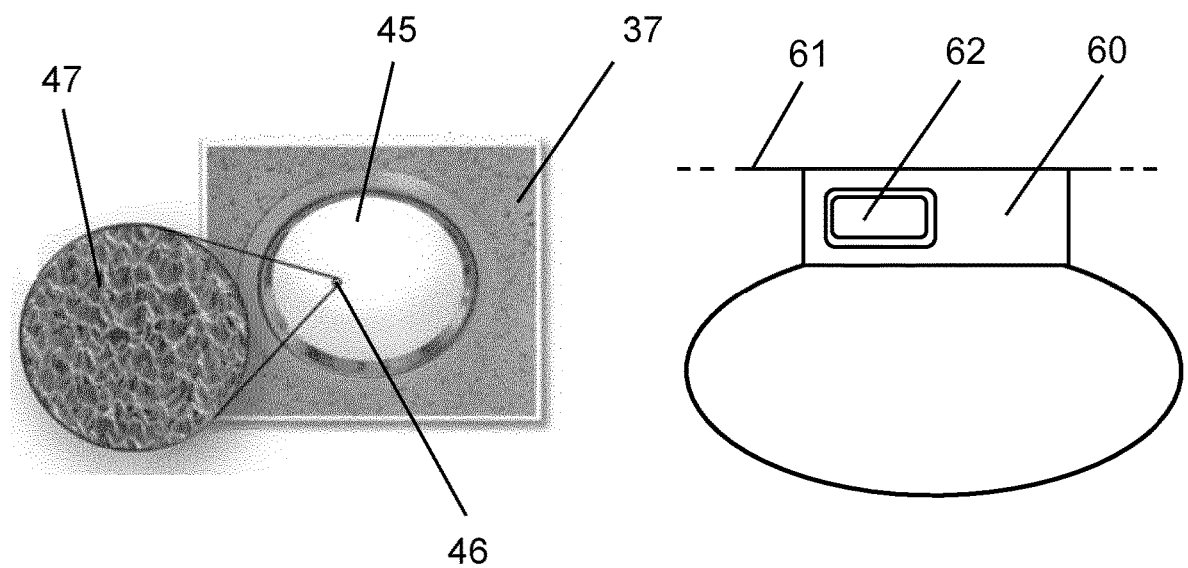
Fig. 4
Fig. 6

SENSOR ASSEMBLY AND A DEVICE COMPRISING SUCH SENSOR ASSEMBLY

CROSS-REFERENCE TO PRIOR APPLICATIONS

This application is the U.S. National Phase application under 35 U.S.C. § 371 of International Application No. PCT/EP2018/065458, filed on Jun. 12, 2018, which claims the benefits of European Patent Application No. 17185924.2, filed on Aug. 11, 2017 and Chinese Patent Application No. PCT/CN2017/089039, filed on Jun. 19, 2017. These applications are hereby incorporated by reference herein.

TECHNICAL FIELD

The present disclosure generally relates to the field of sensors and, more particularly, to the field of motion and light sensors or receivers for surveillance, monitoring, communication and control purposes, for example.

BACKGROUND

Passive Infra-Red, PIR, sensors or receivers allow to sense motion of an infrared, IR, energy radiating body such as a human body, that moves in or across a detection field of view or detection range of the sensor. PIR motion detection sensors, or also often referred to as pyroelectric or IR motion sensors, are relatively small, low-power and easy to install devices, commonly used in homes, offices, retail shops, corridors and other locations for monitoring and/or alarm applications, for automated operation of lighting equipment, for example, and other control purposes.

Whereas a PIR sensor may be used for automated switching of lighting equipment in the presence of a moving IR energy radiating body, ambient light sensors or receivers may be used for automated switching of lighting equipment dependent on a detected ambient light level, for example. That is, lighting equipment is automatically switched-on when the ambient light level drops below a first threshold value, and is switched-off when the detected light level is above a second threshold value higher than the first threshold value. These threshold values may be user settable.

In an office environment, at home, in corridors, or in the public domain, such as in the street, automated switching of lighting equipment dependent on both body motion and ambient light level, is increasingly applied. Not only for convenience of the user, but also for achieving energy savings when a space to be lighted is not occupied, for example.

Ambient light sensors may also be used for optical communication purposes, such as for high speed Visible Light Communication (VLC), also known as LiFi (Light Fidelity), and for control purposes such as changing the colour and intensity of light emitted by a lighting device, for example.

For control purposes, such as for remote control of various types of electric and electronic equipment, Infra-Red, IR, sensors or receivers are in widespread use at home and in the office or other closed environments. In practice, mainly Near Infra-Red, NIR, light is used for remote control applications.

As the above mentioned sensor/receiver technologies may be used jointly, it is advantageous to install or integrate multiple sensors/receivers in a single housing.

An example of such an integrated multisensor solution is, for example, provided by the Philips ActiLume G2 Indus Sensor H513. This multisensor assembly comprises, in a single housing, a PIR receiver for motion detection, an IR receiver for receiving information from an external source such as a remote controller, a daylight receiver for sensing ambient lighting level and a bi-colour Light Emitting Diode, LED, for indication status of powering of the sensor and sensed control and/or motion signals. The mechanical structure of this multisensor is available from product manuals and is also reproduced in FIG. 1, for convenience.

Another example of a prior art integrated multi-purpose sensor is available from U.S. Pat. No. 7,265,670.

In both examples, each sensor is provided with its own, dedicated receiving window. Such a separated windows structure has a number of drawbacks. The structure as a whole is complicated in design and requires relatively high component costs. In particular when the interface of the respective windows and the housing has to be sealed or otherwise made liquid and dust tight for outdoor use of the multisensor, for example.

Further, as each sensor/receiver requires a certain window size for a desired operation thereof, the dimensions of the housing become relatively large, thereby limiting the opportunities of incorporating the multisensor in devices, such as relatively small lighting devices, for example. Reducing the window size of one or multiple sensors/receivers to reduce the overall dimensions of the multisensor housing degrades the sensitivity of a respective sensor/receiver. From a design perspective, the look-and-feel of such a multisensor having differently shaped receiving windows may preclude use of the multisensor when same has to be visible in a room or space for enabling inspection of the status indicating LED, for example.

SUMMARY

It is an object of the present disclosure to present a sensor assembly comprising multiple sensors or receivers accommodated in a single housing having reduced dimensions compared to the prior art, without compromising detection sensitivity, such as the detection field of view or detection range of the individual sensors/receivers, or to provide increased detection sensitivity with given or prescribed housing dimensions compared to the prior art.

In a first aspect, there is provided a sensor assembly comprising a housing having a receiving window covered by an optically transparent cover, the housing accommodating electric components at least comprising a motion sensor and an ambient light sensor, the motion sensor and the ambient light sensor are positioned such that light entering the cover impinges on the motion sensor and the ambient light sensor, and an optical diffuser, positioned between the cover and the ambient light sensor, such that light entering the cover traverses the optical diffuser before impinging on the ambient light sensor.

In the present solution, the sensor assembly comprises a receiving window that is common to all the sensors in the housing. That is, incident light for each sensor is received through this common receiving window, i.e. the optical transparent cover covering the receiving window. The size of the receiving window and the cover may be advantageously adapted to the sensor or receiver requiring the largest window size which, in general, will be the motion sensor, without having to reserve surface area at the housing for arranging a receiving window for another sensor/receiver.

To avoid receiving too low light levels or, to the contrary, receiving too high light levels at the ambient light sensor or receiver due to focussing properties of the optically transparent cover, for example, an optical diffuser is arranged between the ambient light sensor and the cover. By this diffuser, light entering the cover will be diffused, i.e. spread or scattered, across the detection area of the ambient light sensor, thereby avoiding false readings or indications caused by brief periods of abnormal incident light concentrated by the cover on the ambient light sensor, such as occurring from direct sunlight or a reflective glare from desks, sunblinds, etcetera. That is, the diffuser in general minimizes false measurements or false triggers due to a too high or too low ambient light intensity caused by the optical properties of the cover, for example being adapted or optimized to the operation of an other sensor arranged in the housing.

In the case of an ambient light sensor operating for communication purposes, such as data communication in a LiFi network, the diffuser is effective in controlling the receiving range of the sensor assembly, for example.

Hence, the sensor assembly according to the present disclosure provides a more versatile design of the assembly housing and/or cover without comprising the detection sensitivity of the individual sensors/receivers compared to prior art solutions. The increased design freedom may further result in developing a housing providing the sensor assembly a more attractive look-and-feel compared to the prior art designs, for example particularly adapted to areas of use, such as at home, in the office, or in public spaces indoors or outdoors, for example.

In an embodiment according to the present disclosure, the electric components further comprise an Infra-Red, IR, sensor or receiver positioned such that light entering the cover impinges on this IR sensor. The IR sensor may be operative for control purposes, such as remote control of devices by an external remote controller, as elucidated in the above background section.

In another embodiment, the electric components further comprise a Light Emitting Diode, LED, indicator and a light guide, wherein the light guide is optically coupled to the LED and is arranged for directing light input from the LED to an exterior portion of the housing.

The light guide is arranged to effectively prevent spreading of light inside the housing, and to direct the light from the LED to the exterior of the housing, thereby preventing optical interference within the housing that may cause false triggers and readings by the various sensors or receivers accommodated in the housing. The light guide operates as a dedicated channel to allow passage of light without letting light escaping from it.

For providing direct feedback of the power status of the sensor assembly or signal receipt by a respective sensor, such as a short blinking of the LED in case of the receipt of a remote control signal by the IR sensor, in an embodiment, the light guide is arranged for directing light input from the LED through the cover.

The ambient light sensor, also called a photodetector or photosensor, the IR sensor, if available, and the motion sensor for use in the present disclosure may be of any know or available sensor type. In a further embodiment of the disclosure, the motion sensor is a Passive Infra-Red, PIR, sensor. The use of PIR sensors as motion detectors is well established and needs no further detailed explanation for the person skilled in the art.

In embodiment of the present disclosure, the optically transparent cover is made of a material that is at least transparent to any of Near Infra-Red, NIR, Far Infra-Red, FIR, and visible light. The term visible light in the present description and the claims substantially refers to light in the spectral range visible to a human being.

Since one or more sensors operate by sensing either the visible portion of the incident radiation (the ambient light sensor) or the IR portion of the incoming radiation, (the IR sensor, the PIR sensor), the cover for the receiving window should at least be transparent to the visible and IR portions of the incoming radiation. This ensures that the sensors are able to sense and function efficiently in accordance with their specifications. In practice, the PIR sensor substantially responds to radiation being emitted in the FIR region (wavelengths from 15 μm to 1 mm), and the IR sensor, for receiving signals from an external remote controller, substantially responds to radiation in the NIR region (700 nm to 2500 nm).

In an embodiment of the sensor assembly, the optically transparent cover comprises a Fresnel lens arranged for providing a detection field of view of the motion sensor. A Fresnel lens is a compact optical diffractive lens, usually characterized by a large aperture and a short focal length. This allows the Fresnel lens to capture more oblique light from a light source, than a conventional refractive lens of the same size. Fresnel lenses can also be designed to be much thinner than conventional refractive lenses, often taking the form of a substantially flat sheet. When utilized with the sensor assembly as discussed above, the lens is able to capture more oblique light from the surroundings thereby increasing the sensing area of the motion sensor, i.e. the PIR sensor. The Fresnel may be shaped to provide a required detection field of view and main focal point.

When utilizing a Fresnel lens as the cover of the receiving window, it is advantageous to place the various sensors at the focal point or focal plane of the lens. Ideally, at least the motion sensor should be placed at the focal point of the Fresnel lens. A focal plane may be defined as the plane containing the focal point of the lens and perpendicular to the optical axis of the lens. In practice, it may be useful to place the ambient light sensor and/or the IR sensor slightly behind or ahead of the focal plane, to spread the incident light over a greater area of a respective sensor, i.e. the area of the optical diffuser in front of the ambient light sensor, such that the light that is being converged by the Fresnel lens is properly diffused or scattered before impinging on the ambient light sensor.

In an embodiment according to the present disclosure, the optical diffuser is positioned on top of the ambient light sensor. Placing the optical diffuser in close conjunction with the ambient light sensor prevents scattering of light by the diffuser in the direction of the motion sensor or other sensors in its vicinity. The ambient light sensor and the optical diffuser may be designed as a single entity with the optical diffuser sitting on top of the ambient light sensor.

The optical diffuser, in an embodiment of the present disclosure, is particularly arranged for diffusing visible light. As mentioned above, the main function of the optical diffuser is to diffuse the light impinging on the ambient light sensor, which senses the intensity of the visible ambient light. The diffuser may comprise a sheet of optically transparent material at which micro structures are designed, thereby diffusing light. The microstructures may be designed such that same only affect the visible range of incoming radiation.

In an embodiment of the present disclosure, operation of the optical diffuser is restricted to the ambient light sensor.

As discussed earlier, the diffusion caused by the optical diffuser only affects the ambient light sensor and not the other sensors in its vicinity.

The electric components further comprise electronic processing circuitry, arranged for controlling and processing signals generated by any of the sensors and the LED, if applicable, accommodated by the housing. The electronic processing circuits may comprise any of digital and analogous operating electronic components, including one or more digital (micro)processors.

In an embodiment according to the present disclosure, the housing comprises a Printed Circuit Board, PCB, at which the electric components are mounted. From a practical constructive and economical point of view, all the electric components may be mounted on a single PCB. This enables to keep the overall structure to remain compact. If a Fresnel lens is used as the cover for the receiving window, for example, the PCB may be located at the focal plane of the Fresnel lens. The position of the components at the PCB should be such that the motion sensor or the PIR sensor shall ideally be placed as close to the focal point of the Fresnel lens as possible.

With the structure of two sensors on same PCB board, the ambient light sensor has a clear view field and less angle dependent and hence is more sensitive.

In an embodiment of the present disclosure, the housing is advantageously comprised of a single, integral structure. For example produced from plastic material. The housing may be manufactured identically for a number of sensor assemblies, while the cover of the receiving window may be designed to meet particular sensing specifications, for example. The receiving window may substantially completely extend over a surface of the housing, thereby not only fully exploiting the advantages of a single detection aperture, but also such that the electric components, for example mounted at a PCB, can be installed and mounted in the housing from the receiving window, after which same is closed by the optical transparent cover. As opposed to the more complicated process of shaping a housing to a plurality of dedicated receiving windows, the manufacture of a single integral structure is much quicker and cheaper.

The housing may be designed in any shape, such as a semi-cylindrical or elliptical shape. This shape provides a flat inner back surface, upon which the electric components on a PCB may be mounted, and a curved surface which can accommodate the receiving window. A curved receiving window is able to detect incoming radiation from a wider detection area compared to a flat detection window.

In an embodiment according to the disclosure, the housing further comprises a sealing component arranged for sealing an interface of the window and the optically transparent cover, for protecting components accommodated by the housing from external atmospheric factors. In particular for outdoor use or for use in wet rooms at home or in a factory environment, the electric components of the sensor assembly have to be protected from atmospheric influences such as moisture and dust. In the present disclosure, a single sealing element in between the window and the housing suffices. This is a further advantage of having a single receiving window rather than multiple individual receiving windows.

In a second aspect, there is provided a device comprising a sensor assembly according to the present disclosure as elucidated above. Non-limiting examples of such a device are lighting fixtures or armatures, security or surveillance cameras, electric plug boxes, electric time clocks, and many more.

The above and other aspects of the disclosure will be apparent from and elucidated with reference to the embodiments described hereinafter.

BRIEF DESCRIPTION OF THE DRAWINGS

FIG. 4 shows an example of a optical diffuser for use in the sensor assembly according to the present disclosure.

FIG. 5 shows a schematic, partial cross section, view of a further exemplary embodiment of a sensor assembly according to the present disclosure.

FIG. 6 shows a schematic plane view of a lighting device comprising a sensor assembly according to the present disclosure.

DETAILED DESCRIPTION

Figure 1:
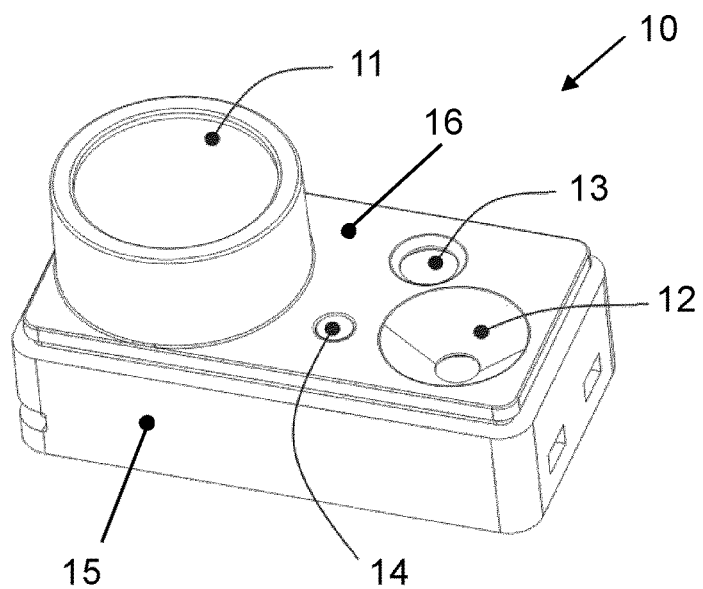
FIG. 1 shows a schematic perspective view of a prior art sensor assembly.

In the description of the figures, same reference numerals indicate a same or similar component performing essentially the same or a similar function.

FIG. 1 shows, by way of example, an embodiment of the Philips ActiLume G2 Indus Sensor H513, generally indicated by reference numeral 10.

This know sensor assembly 10 comprises a housing 15 accommodating a plurality of sensors, each having its own dedicated sensing or radiation receiving window at a front surface 16 of the housing 15. Receiving window 11 is associated with a Passive Infra-Red, PIR, motion sensor or receiver. Receiving window 12 corresponds exclusively with an ambient light sensor or receiver and receiving window 13 belongs to an Infra-Red, IR, sensor receiver, such as IR radiation emitted by a remote controller (not shown).

The housing 15 also accommodates a bi-colour Light Emitting Diode, LED, for indicating an operation status of the sensor assembly 10, such as a power-on status and sensed control and/or motion signals, for visual feedback purposes. Light emitted by the indicating LED is visible from the front surface 16 of to housing 15 through an aperture or window 14 in the front surface 16.

Although not shown, the housing 15 may accommodate electric/electronic circuitry for controlling the respective sensors and for providing output signals representative of the detection of motion of a heat radiating body, ambient light levels and/or IR control signals of a respective sensor, and for inputting control signals to the indicating LED.

As elucidated in the background section, the separated windows structure makes the construction as a whole complicated in design and requires relatively high component costs. In particular when the interface of a respective window and the front surface 16 of the housing 15 has to be sealed by a dedicated optically transparent cover or otherwise made liquid and dust tight for outdoor use of the sensor assembly, for example. As each sensor/receiver requires a certain window size for proper operation thereof, the dimensions of the front surface 16 of the housing 15 may become relatively large. Reducing the window size of one or multiple sensors/receivers to reduce the overall dimensions of the housing 15 may degrade or impede the sensitivity of a respective sensor/receiver, thereby limiting the design freedom for reducing the dimensions of the housing 15, for example for use of the sensor assembly in relatively small sized devices, like small lighting devices, surveillance or monitoring camera's, and the like.

Due to the separate windows, the design look-and-feel of the sensor assembly 10 may not be appealing to users and may preclude use of the sensor assembly 10 for indoor use when the sensor assembly 10 has to be visible in a room or space for enabling inspection of the status indicating LED, for example.

Figures 2, 3:
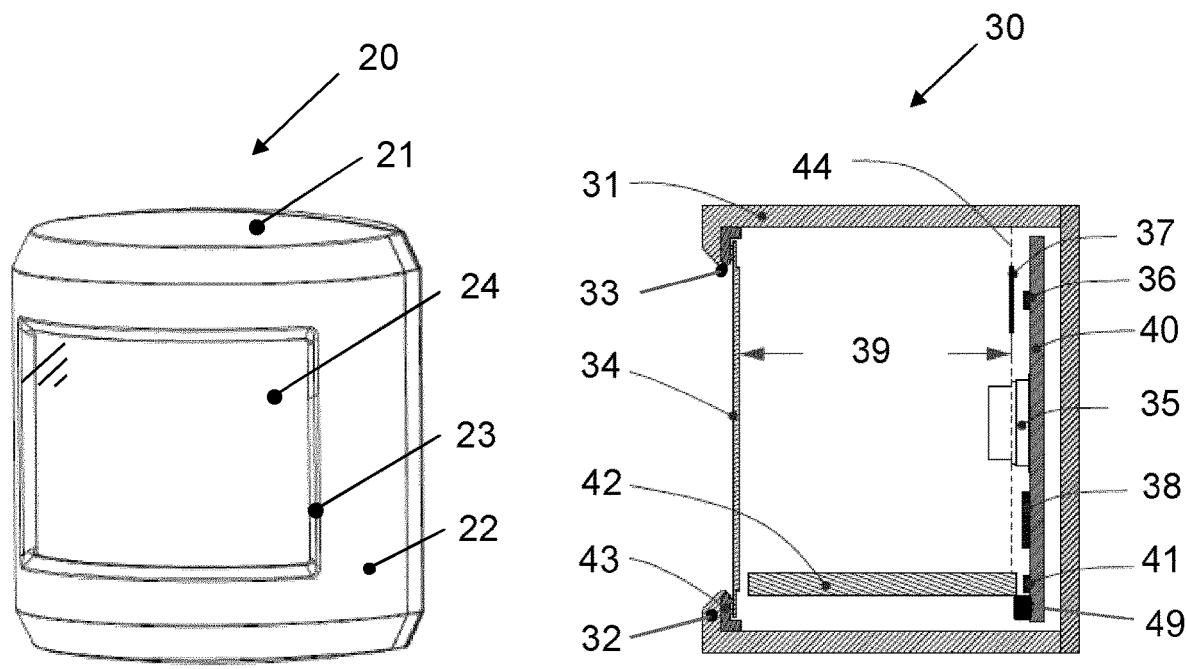
FIG. 2 shows a schematic perspective view of an exemplary embodiment of a sensor assembly according to the present disclosure.
FIG. 3 shows a schematic, partial cross section, view of another exemplary embodiment of a sensor assembly according to the present disclosure.

FIG. 2 shows an example of a sensor assembly 20 according to the present disclosure, comprising a semi-cylindrical or elliptical shaped housing 21, having a curved front surface 22 with a single receiving window or aperture 23, covered by an optically transparent cover 24. The housing 21 further accommodates electric components, at least comprising a motion sensor or receiver and an ambient light sensor or receiver, and optionally comprising an IR sensor or receiver and an indicating LED (not shown). The housing 21, may, of course comprise multiple sensors or receivers of a same type and/or other sensors/receivers than explicitly mentioned above.

In the exemplary embodiment of the sensor assembly 20, the receiving window 23 nearly completely occupies the curved front surface 22 of the housing 21, whereas the sensors/receivers are arranged in the housing 21 such that light entering the cover 24 impinges on the sensors/receivers accommodated in the housing 21.

This is beneficial, as it provides view over a greater area and the sensor assembly receives incoming radiation from a wider angle and is therefore able to detect motion over a wider area.

The housing 21 may be made of a suitable optically opaque material, such as an opaque plastic. Such a plastic housing can be easily integrally, i.e. in one piece, manufactured using fairly simple manufacturing processes, such as injection moulding or by 3D printing, for example. For outdoor use, for example, the housing may be made of a fiber reinforced plastic or metal, providing a desired degree of resistance against vandalism.

The cover 24 in the receiving window 23 is made of an optically transparent material. This may be a flat piece of optically transparent material or additionally be designed for focussing radiation received at the cover 24 towards the motion sensor, such as a Fresnel lens, and/or for providing a particular shaped detection area, such as a zone shaped detection area or field of view, for example. Again, from a point of a view of reducing weight and ensuring portability, for example, the cover 24 itself may be constructed of a light weight material, such as an optically transparent plastic like polymethyl methacrylate, PMMA, also known as acrylic or acrylic glass.

The housing 21 may be of a different shaped than shown in FIG. 2, although a curved front surface 22 and curved cover 24 is beneficial for achieving a relatively wide detection or sensing area compared to a flat front surface, for example, as result that the sensor assembly 20 may detect motion or control signals over a relatively wide area.

FIG. 3 shows a partial cross section view of another exemplary embodiment of a sensor assembly 30 according to the present disclosure. The electric components are assembled inside a housing 31 comprising a front surface 32 having a receiving window 33 nearly completely occupying the front surface 32 and that is covered by a cover 34. In this exemplary embodiment, the electric components are mounted on a Printed Circuit Board, PCB 40. The housing 31 and the cover 34 may be made of a same material as mentioned above in connection with the housing 21 and cover 24 of the sensor assembly 20.

In the embodiment shown in FIG. 3, the PCB 40 comprises a motion sensor or receiver 35, such as a PIR sensor, an ambient light sensor or receiver 36, an IR sensor or receiver 38, and an indicating LED 41, The PCB 40 may comprise further electric/electronic circuits, generally designated by reference numeral 49, and is mounted in a virtual plane 44 at a certain distance 39 from the cover 34. This distance 39 may be chosen in view of the angle of incoming radiation which the motion sensor 35 is able to respond to. The motion sensor 35 may be located opposite the centre of the cover 34, to symmetrically receive incoming radiation from the whole cover 34. If however, it is desired that the motion sensor should detect motion only in one particular side, the position of the motion sensor 35 within the sensor assembly 30 may be deviated from the centre position.

The ambient light sensor 36 is a sensor that is able to produce a voltage or current output signal, the strength of which depends upon the amount/intensity of visible light impinging at the ambient light sensor 36, such as a photodetector or photosensor. Since the sensor may be designed to produce a voltage/current output level in direct proportion to the amount of light received, it is likely to produce a higher output signal when, for example, a beam of light is directed to incident upon the ambient light sensor 36. This may be the case, for example, as a result of direct sun light directly falling upon the relatively large receiving window 33, or light being reflected on to the receiving window 33 of the sensor assembly 30. It will be appreciated that in such case the measurement or reading by the ambient light sensor 36 does not truly reflect the ambient lighting level present in the area being sensed by the sensor assembly 30.

To avoid such false measurements as much as possible, in the housing 31 an optical diffuser 37 is arranged between the cover 34 and the ambient light sensor 36. The purpose of the optical diffuser 37 is to diffuse or spread any direct beam of incident radiation over the detection surface or area of the ambient light sensor 36, such to correctly sense an average ambient lighting level. The diffuser 37 may be constructed as a sheet of optically transparent material, such as PET sheet or the above mentioned PMMA, for example, on a surface side of which micro-structures have been added to achieve a light spreading or diffusion effect. From an assembling point of view, it is advantageous to manufacture the ambient light sensor 36 and the optical diffuser 37 as a single unit.

FIG. 4 shows an example of an optical diffuser 37 for use in the sensor assembly according to the present disclosure. The diffuser 37 is comprised of a piece of plastic material having a visible light diffusion area 45 to be positioned at or at a distance in front of the sensing area of the ambient light sensor 36. In the embodiment shown, the light diffusion area 45 bears micro-structures 47, as shown in the enlarged view of a spot 46 of the light diffusion area 45, at the left-hand side of FIG. 4. Light impinging on the micro-structures is randomly scattered over the diffusion area, thereby evenly spreading the light over the sensor surface, and avoiding false readings by the ambient light sensor 36 due to high concentrations of spot light beams, for example. As will be appreciated, the diffuser 37 may also take the form of a diffuse glass sheet material or a material having a relatively high so-called Haze factor.

The IR sensor 38 is included so that the sensor assembly 30 is capable of receiving instructions/optical signalling from an external source (not shown in figure). Such an external source may be, for example, a remote IR controller. Using such a remote controller, the user may be able, inter alia, to turn ON or OFF the sensor assembly 30, to set or amend threshold levels for the various sensors 35, 36, to control a device in which the sensor assembly is incorporated, etc.

The LED 41 is included so as to indicate the status of the sensor assembly and/or for providing an optical feedback to a user in response to remote control commands, for example. The LED 41 may preferably be a multi-colour LED which is capable of emitting light in at least two colours. Thus, to indicate with different colours the status of the sensor assembly 30. As an example, the LED may be blinking at a uniform interval with a red light while indicating that the sensor assembly 30 is currently operating. On the other hand, a green light may indicate to the user that a particular motion has been detected by the sensor assembly 30, for example.

The LED indicator 41 is coupled to an optical light guide 42. The light guide 42 is a channel for the transmission of light emitted by the LED 41 to an exterior portion of the housing 31. Compared to traditional sources of light such as incandescent bulbs and fluorescent bulbs, a LED is more directional in nature. Nevertheless, light emitted by a LED is likely to disperse. This has two effects. Firstly, such light is likely to interfere with other sensors at the PCB 40, especially the ambient light sensor 36 which is susceptible to the radiation in the visible light spectrum. Secondly this dispersion reduces the intensity with which a user is able to perceive the light being emitted by the LED 41.

By applying the light guide 42, such unwanted interference is effectively prevented. The optical light guide 42 operates on the principle of total internal reflection to contain a beam of light within a certain cavity and allow same to exit the cavity in a desired manner. As a result, there is little or no interference caused with the ambient light sensor 36 and the IR sensor 38, and the user is able to perceive the intensity of the LED 41 without any visible reduction. Consequently, a low power LED 41 may be employed, thereby reducing the overall power requirements of the sensor.

In the embodiment shown in FIG. 3, the optical light guide 42 ends closely adjacent to the cover 34, for directing light input from the LED 41 through the cover 34. It will be appreciated that the light guide 42 may end in an aperture of the front surface 32 or in any other surface of the housing 31.

Form the point of view of ease of assembly, it is advantageous to mount all electric components on the PCB 40 and place the PCB on a plane close to the rear part of the housing 31, i.e. opposite the front surface 32. Additionally, in order to protect the electric components placed in the interior of the housing from atmospheric influences, such as moisture and dust, a circumferential sealing 43 may be provided in between the cover 34 and the receiving window 33, i.e. the front surface 32 of the housing 31. This sealing may be made of rubber or any other elastic material that is capable of effectively sealing the interior components from external factors such as dust and water. The cover 34 may be flexible, i.e. bendable, for positioning same in a form-fit manner in a circumferential slot of the sealing 43 or the housing 31, for example.

FIG. 5 shows a partial cross section view of another exemplary embodiment of a sensor assembly 50 according to the present disclosure. In this embodiment, the receiving window 33 is covered by a Fresnel lens 51. The Fresnel lens 51 is positioned such that the light incident upon it from an exterior portion of the housing 31 is focused at a point in the interior of the housing 31. The electric components that are mounted on the PCB 40, are then mounted at a distance 52 away from the Fresnel lens 51, such that the distance 52 corresponds to the focal length of the Fresnel lens 51. In other words, the components are placed at the focal plane of the Fresnel lens 51, indicated by reference numeral 53. The Fresnel lens 51 may be deigned to provide a particular wide detection area and/or a particular shaped, such as a zone shape, detection area in front of the motion sensor 35.

FIG. 6 shows an example of an electric or electronic lighting device 60 arranged for ceiling mounting 61 and comprising a sensor assembly 62 in accordance with the present disclosure. Use of the sensor assembly is not limited to lighting fixtures or armatures, but the device 60 may also take the form of a security or surveillance camera, an electric plug box, an electric or electronic time clock, etc.

Other variations to the disclosed embodiments can be understood and effected by those skilled in the art in practicing the claimed disclosure, from a study of the drawings, the disclosure, and the appended claims, In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope thereof.

The invention claimed is:

1. A sensor assembly, comprising a housing having a receiving window covered by an optically transparent cover, said housing accommodating electric components at least comprising a motion sensor and an ambient light sensor, wherein the motion sensor is separate from the ambient light sensor, and wherein said receiving window is common to said motion sensor and said ambient light sensor, said motion sensor and said ambient light sensor are positioned such that light entering said cover impinges on said motion sensor and said ambient light sensor, and an optical diffuser, positioned between said cover and said ambient light sensor, such that light entering said cover traverses said optical diffuser before impinging on said ambient light sensor; wherein the optical diffuser is separate from the cover, and wherein the sensor assembly further comprises a Printed Circuit Board, PCB, at which said electric components are mounted.

2. The sensor assembly according to claim 1, wherein said electric components further comprise an Infra-Red, IR, sensor positioned such that light entering said cover impinges on said IR sensor.

3. The sensor assembly according to claim 1, wherein said electric components further comprise a Light Emitting Diode, LED, indicator and a light guide, wherein said light guide is optically coupled to said LED and is arranged for directing light input from said LED to an exterior portion of said housing.

4. The sensor assembly according to claim 3, wherein said light guide is arranged for directing light input from said LED through said cover.

5. The sensor assembly according to claim 1, wherein said motion sensor is a Passive Infra-Red, PIR, sensor.

6. The sensor assembly according to claim 1, wherein said optically transparent cover is made of a material that is at least transparent to any of Near Infra-Red, NIR, Far Infra-Red, FIR, and visible light.

7. The sensor assembly according to claim 1, wherein said optically transparent cover comprises a Fresnel lens arranged for providing a detection field of view of said motion sensor.

8. The sensor assembly according to claim 1, wherein, said optical diffuser is positioned on top of said ambient light sensor, and wherein the optical diffuser is spaced a distance from the cover.

9. The sensor assembly according to claim 1, wherein said optical diffuser includes a visible light diffusion area and the optical diffuser is arranged for diffusing visible light.

10. The sensor assembly according to claim 1 wherein said electric components further comprise processing circuitry arranged for controlling and processing signals generated by any of said electric components accommodated by said housing.

11. The sensor assembly according to claim 1, wherein said housing is comprised of a single, integral structure.

12. The sensor assembly according to claim 1, wherein said window substantially completely extends over a surface of said housing.

13. The sensor assembly according to claim 1, further comprising a sealing component arranged for sealing an interface of said window and said optically transparent cover, for protecting components accommodated by said housing from external atmospheric factors.

14. An electric or electronic device comprising a sensor assembly according to claim 1.

* * * * *